United States Patent
Choudhuri (10) Patent No.: US 10,052,561 B2
(45) Date of Patent: Aug. 21, 2018

(54) TRACKING AND RECOMMENDATION SYSTEM FOR ONLINE GAMING

(71) Applicant: Antoni Choudhuri, San Francisco, CA (US)

(72) Inventor: Antoni Choudhuri, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 270 days.

(21) Appl. No.: 15/076,200

(22) Filed: Mar. 21, 2016

(65) Prior Publication Data

US 2017/0266565 A1    Sep. 21, 2017

(51) Int. Cl.
*A63F 13/12* (2006.01)
*A63F 13/795* (2014.01)
*A63F 13/335* (2014.01)

(52) U.S. Cl.
CPC .......... *A63F 13/795* (2014.09); *A63F 13/335* (2014.09); *A63F 2300/407* (2013.01); *A63F 2300/556* (2013.01)

(58) Field of Classification Search
USPC .......................................... 463/42
See application file for complete search history.

(56) References Cited

U.S. PATENT DOCUMENTS

| 2011/0190062 A1* | 8/2011 | Lee ........................... | A63F 9/24 463/42 |
| 2012/0271883 A1* | 10/2012 | Montoya ............... | H04W 4/023 709/204 |

\* cited by examiner

*Primary Examiner* — Pierre E Elisca
(74) *Attorney, Agent, or Firm* — Donald R. Boys; Central Coast Patent Agency, LLC (57) ABSTRACT

A method includes steps of admitting a first player and a second player to play an on-line video game implemented in a virtual environment, establishing a definition of proximity for any two objects or avatars in the virtual environment, tracking location in the video game for each player avatar or object controlled by a player, noting an event each time the two players are in proximity, as defined by the proximity definition, recording time period that the two players are in proximity for each event, and issuing to one or both players a Friend suggestion for the other player, based on proximity events and time in proximity.

14 Claims, 4 Drawing Sheets

Fig. 1

Virtual World (Game Geography)

TRACKING AND RECOMMENDATION SYSTEM FOR ONLINE GAMING

BACKGROUND OF THE INVENTION

1. Field of the Invention

The present invention is in the field of online gaming and pertains more particularly to methods and apparatus for suggesting friendships between game players based on virtual proximity and time spent together in a game having virtual geography.

2. Discussion of the State of the Art

In the field of interactive online gaming, players subscribe to a game provider service in order to play interactive games available at service sites in the Internet network. Such services often involve membership services and include social interaction services that players may utilize to connect with one another in chat, game play, club membership, and the like.

A player playing a game online may "friend" other players by sending a friend request to the other player, wherein the other player may accept friendship or ignore the request. In many instances players play games but do not friend other players while gaming. It may be desired by a gaming service provider to have more "friendships" established amongst game players in order to promote enhanced experience by players, continued game play and to increase the online presence of game service members.

Online games that are based on virtual geography are often described as virtual worlds in the gaming industry. Examples may include games like Mine Craft, Dungeon Crawl, Halo, and others. Players that are dropped into a virtual world hit the ground running and may encounter other players while exploring or navigating the geography of the virtual world. Players may travel together, fight together, be pursued by the same enemies, be promoted to a same higher game level, etc.

Currently in the art, there is no facility for third party determination of what common virtual proximity might exist between two players navigating a same virtual world or game with virtual geography, nor for quantifying the actual time spent within what might be deemed a local virtual proximity between the two players.

Therefore, what is needed is a method for tracking in near to real time the proximity of two or more players in an online game having a measurable virtual geography, and the time spent within that proximity for the purpose of recommending by the third party "friendship cultivation" amongst those players.

BRIEF SUMMARY OF THE INVENTION

In an embodiment of the invention a method is provided, comprising admitting a first player and a second player to play an on-line video game implemented in a virtual environment, establishing a definition of proximity for any two objects or avatars in the virtual environment, tracking location in the video game for each player avatar or object controlled by a player, noting an event each time the two players are in proximity, as defined by the proximity definition, recording time period that the two players are in proximity for each event, and issuing to one or both players a Friend suggestion for the other player, based on proximity events and time in proximity.

In one embodiment of the method a matrix coordinate system is determined for the virtual environment, and locations and proximity are determined with reference to coordinates of avatars or objects controlled by the players. Also in one embodiment a definition of proximity is based upon a predefined area in the virtual environment. Also in one embodiment one or more predefined areas are determined by specific terrain or building elements.

In one embodiment events and time in proximity are recorded and associated with each player, and Friend suggestion is initiated based on repetitions of threshold events and total time in proximity. Also in one embodiment, once a Friend suggestion is determined to be warranted, a time delay is imposed before a Friend suggestion is issued. Also in one embodiment the method further comprises determining at the end of the time delay whether the two players have become friends during the time delay, and cancelling the friend suggestion if true. And in one embodiment multiple games and a plurality of players are tracked, and records are updated and friend suggestions are issued at specific periods.

In another aspect of the invention a video game platform is provided, comprising a network-connected server having processors executing software from a non-transitory medium, execution of the software providing games implemented in virtual environments to be played, mechanisms for admitting players to choose and play the games, and memory recording data regarding players and games. Execution of the software also provides admitting a first player and a second player to play one of the games, establishing a definition of proximity for any two objects or avatars in the virtual environment, tracking location in the video game for each player avatar or object controlled by a player, noting an event each time the two players are in proximity, as defined by the proximity definition, recording time period that the two players are in proximity for each event, and issuing to one or both players a Friend suggestion for the other player, based on proximity events and time in proximity.

In one embodiment of the platform a matrix coordinate system is determined for the virtual environment, and locations and proximity are determined with reference to coordinates of avatars or objects controlled by the layers. Also in one embodiment a definition of proximity is based upon a predefined area in the virtual environment. Also in one embodiment one or more predefined areas are determined by specific terrain or building elements. Also in one embodiment events and time in proximity are recorded and associated with each player, and Friend suggestion is initiated based on repetitions of threshold events and total time in proximity.

In one embodiment, once a Friend suggestion is determined to be warranted, a time delay is imposed before a Friend suggestion is issued. Also in one embodiment the platform further comprises determining at the end of the time delay whether the two players have become friends during the time delay, and cancelling the friend suggestion if true. And in one embodiment multiple games and a plurality of players are tracked, and records are updated and friend suggestions are issued at specific periods.

DETAILED DESCRIPTION OF THE INVENTION

In various embodiments described in enabling detail herein, the inventors provide a unique system and method for tracking relative proximity between two or more active players in a virtual space and for recommending one or more actions based on evidence of the player's proximity and their current or recent status. The present invention is described using the following examples, which may describe more than one relevant embodiment falling within the scope of the invention.

Figure 1:
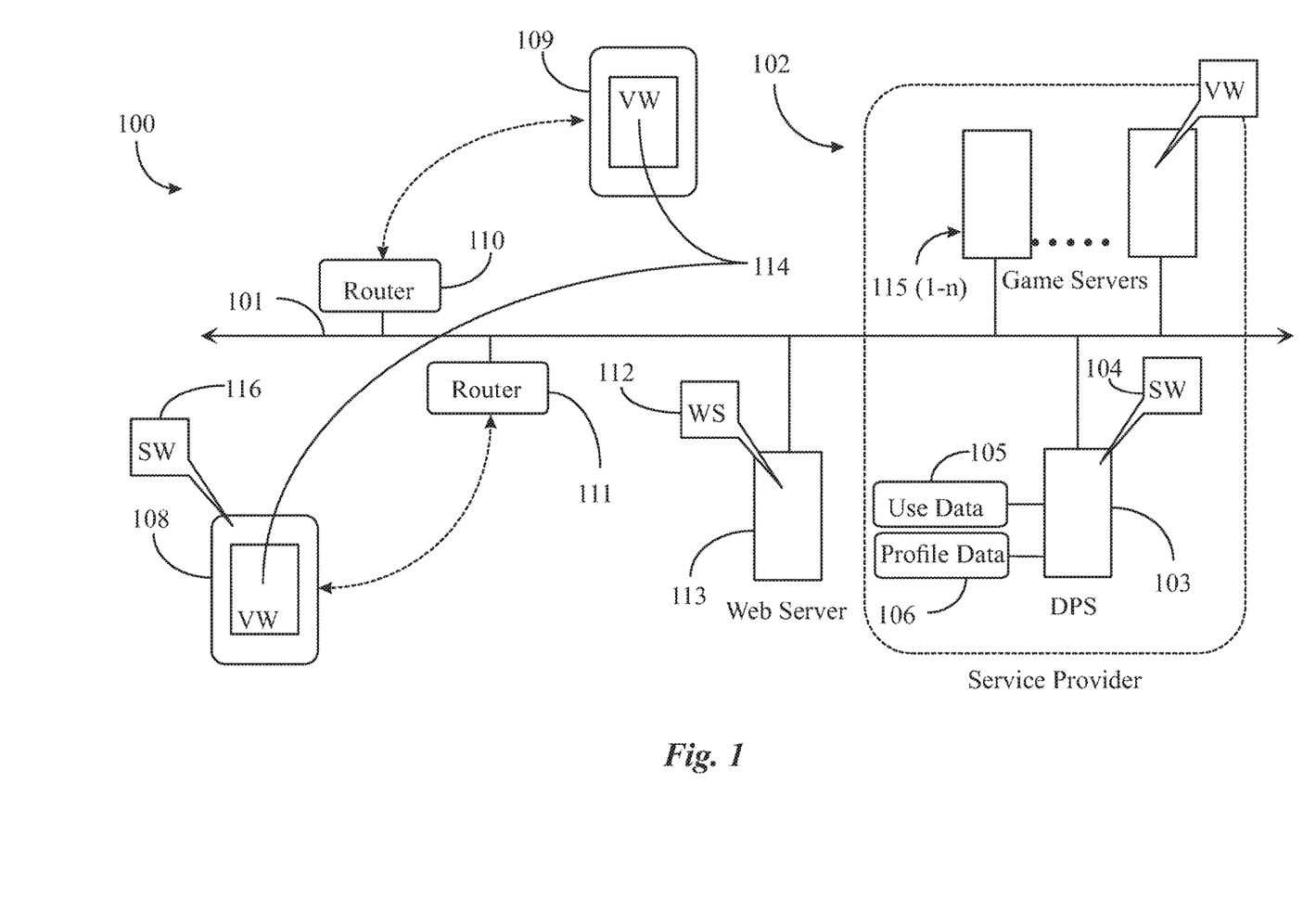
FIG. 1 is an architectural overview of a gaming system supporting proximity detection between active players for the purpose of recommendation of online friendship to tracked players according to an embodiment of the present invention.

FIG. 1 is an architectural overview of a gaming network 100 supporting proximity detection between active players in a virtual space for the purpose of recommendation of one or more actions to the tracked players according to an embodiment of the present invention. FIG. 1 is an architectural overview of a gaming network 100 supporting notification of friend recommendations to targeted players based at least in part on virtual geographic proximity between the tracked players within a specific virtual world or game having suitable virtual geography.

Gaming network 100 includes the well-known Internet network illustrated herein by a network backbone 101. Backbone 101 represents all of the lines, equipment and access points that make up the Internet as a whole, including any connected sub-networks. Therefore, there are no geographic limitations to the practice of the present invention. Backbone 101 supports a gaming service provider domain 102. Provider domain 102 includes equipment and software required to provide online gaming services to consumers (players) who subscribe to such services, typically through a Website. Provider domain 102 may maintain a Website (WS) 112 hosted on a Web server 113 supported by backbone 101 in this example. Server 113 may be a third-party Web hosting service or an in-house Web hosting service without departing from the spirit and scope of the present invention.

Website 112 may be a contact point between gaming service subscribers and provider 102. Website 112 enables searching or browsing for games, and may promote featured or highly popular games and or virtual worlds. Website 112 enables secure access and connection to at least one game server. In this example, service provider domain 102 includes game servers 115 (1-n). Game servers 115 (1-n) may be maintained within a physical location of the service provider or they may be cloud-based and distributed over a large geographic region. In a preferred implementation they are distributed and players connect to the server that is open and closest to the accessing player's geographic position in the network for latency reduction purposes.

Backbone 101 supports at least one data router 111, and in this case, another data router 110 that may function as edge routers or bridges connecting a wired or wireless data network (carrier) to the wired Internet network 101 through an Internet service provider (not illustrated). In this implementation, connection to game server(s) 115 (1-n) in domain 102 may be through router 111 or router 110 from a wireless or wired network (not illustrated), enabling gaming devices or stations, such as a gaming device 108 and a gaming device 109, to engage in online game play through the respective routers. Devices 108 and 109 may be any wirelessly-capable or tethered computing appliances having browser-based capability of accessing WS 112 to be redirected to one or more of gaming servers 115 (1-n). In this example devices 108 and 109 are wireless gaming devices such as, but not limited to, a smart phone, a tablet computer, a laptop, a gaming station, or similar devices.

Gaming devices 108 and 109 may have a software (SW) application 116 executable (depicted on device 108) for the purpose of simplifying and specializing gaming experience according to an embodiment of the invention. Application 116 in one embodiment may be acquired by download from WS 112 hosted on Web server 113. Application 116 is browser based and capable of site navigation on the internet network. Application 116 is not required to practice the present invention. In some embodiments it is provided for a mobile-friendly experience for players.

Backbone 101 supports a data back-end processing server (DPS) 103 within domain 102 of the service provider. Data processing sever 103 may subscribe to gaming feeds from servers 115 (1-n) and record game play history of gaming subscribers such as those operating devices 108 and 109. Data processing server 103 hosts a software application 104 that may be a parent or sister application to application 116 on device 108 in some embodiments. Application 104 enables server 103 to receive information about the gaming activity and certain other attributes of players operating devices 108 and 109 through one or more gaming servers 115(1-n). SW 104 enables, among other tasks, software-based tracking of active game player's geo-proximity within a game's virtual space relative to other players tracked during active navigation through the same space. The amount of time players spend in close proximity to other game players may be included in the tracking results.

Back-end processing server 103 may receive game server feeds of "use data" including games being played, identities of the players in the games, the times and durations of playing games, and at least the navigation paths for each player in a game relative to virtual geographic coordinates of the game or virtual space geography. Game use data may be retrieved (pulled) from or fed (pushed) from one or more game servers 115 (1-n), and may be stored in a connected data repository 105 labeled Use Data. Use Data in repository 105 may be purged from the repository after a specified period of time or at a specified maximum load of data. Use Data may include player identity, the identification of the virtual space occupied, and player navigation paths recorded through time of play within the identified space. SW 104 enables DPS 103 to discern geographical location of active game players within the virtual space they are navigating relative to virtual coordinates representing geographic position of an active player within the virtual space.

Server 103 includes a connected data repository 106 containing player profile data. Player profile data may include player name or alias, player age, player gender, player friend associations, player group associations, and other information that may be provided by a player or that a player might give permissions for the service provider to access.

In this example, players operating devices 108 and 109 are engaged in navigation of a virtual world depicted herein as virtual world (VW) 114 served to them by one of servers 115 (1-n). It is noted herein that for purpose of discussion, VW 114 is the same virtual space served to both players and both players are assumed engaged in and navigating that virtual space. For definition, a virtual space may represent any two or three-dimensional space within a virtual world game or any online game having navigable geography, including different levels, each having geography that may be navigated.

Coordinates for such geography may represent virtual terrain using the equivalent of GPS coordinates or virtual terrain using coordinate language understood in the game language that might be specific to a single virtual world or game. In essence, virtual coordinates are provided to identify position of players and the navigation paths of players in a virtual space monitored for close proximity events. Close proximity events may be detected when those players may be in what is deemed in physically close proximity to other players relative to the virtual space geography in a game during a minimum period of time of active play. In a preferred implementation, when players are discovered in close proximity to one another for a minimum period of time during game play, the system may generate and send recommendations to those players such as recommending that the become friends with the other players.

Figure 2:
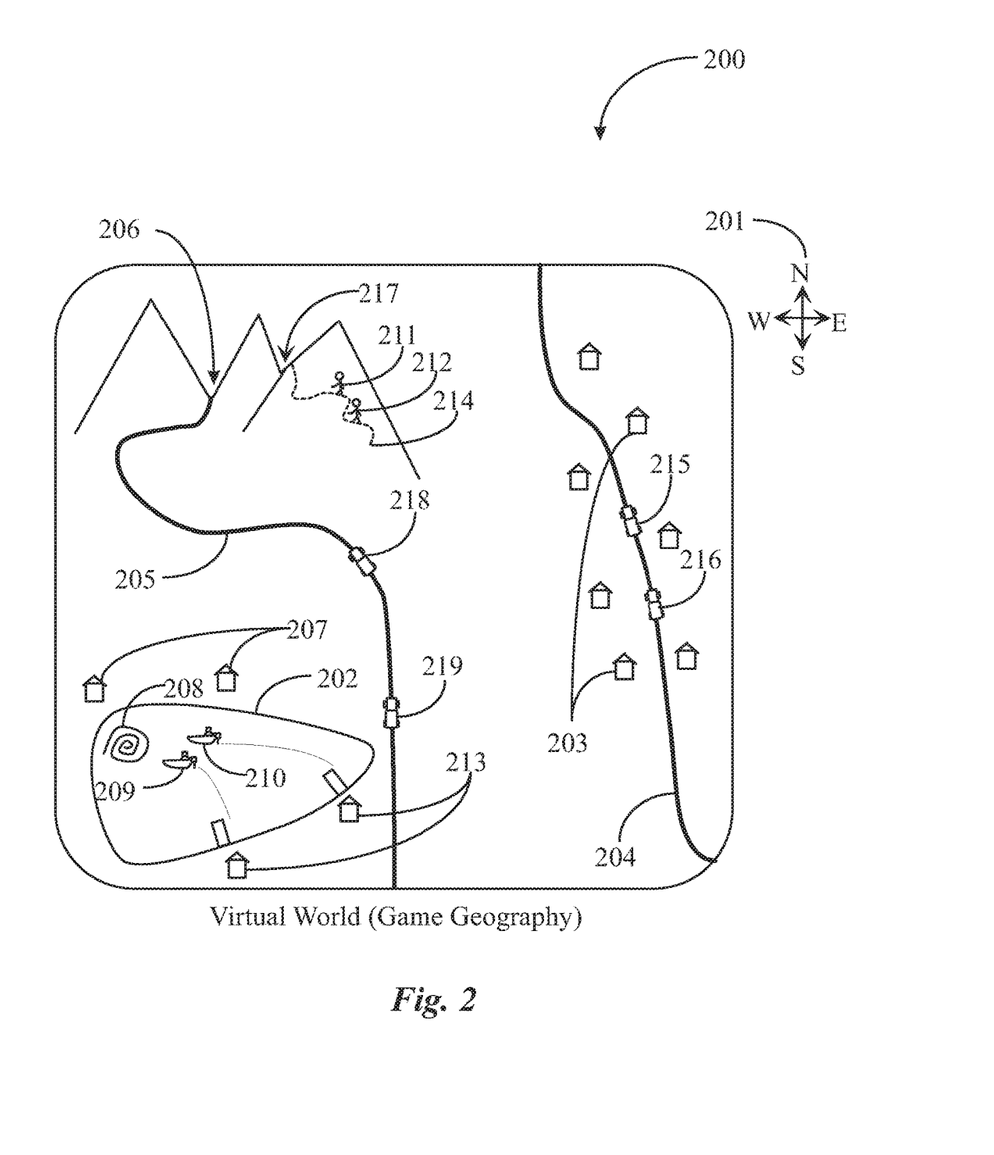
FIG. 2 is a pictorial representation of a virtual gaming space depicting active players tracked in close proximity to one another within the space.

FIG. 2 is a simple pictorial representation of a virtual gaming space 200 depicting active players tracked in close proximity to one another within the space. Virtual space 200 includes navigable virtual terrain such as a road or path 204 through an area containing houses 203. Other navigable terrain within space 200 includes a road or path 205 heading toward a mountain pass 206. Still other navigable features include a lake 202 surrounded by dwellings 207 and dwellings 213 having boat docks on the lake. In this example, lake 202 includes a whirlpool 208, which may be a navigable passageway to another level in the game or world not visible in this view. Other navigable terrain within space 200 includes a mountain path 214 heading through a mountain pass 217.

In this example, there are eight players active within space 200. Active players depicted herein include players 209 and 210 navigating lake 202 using boats, players 211 and 212 hiking on path 214. Space 200 may include indication 201 of where is North, South, East, and West. Space 200 may be assigned virtual grid-like coordinates for terrain that may be similar to GPS coordinates on a geographical map. Positional coordinates may also be assigned to the space above and below the terrain such as the air space and within features such as lake 201. Virtual coordinate points may include a latitude coordinate and a longitude coordinate or and x coordinate and a y coordinate and a z coordinate for third dimension such as elevation.

Coordinates may be based on a standard unit of measure or on a "created" unit of measure understood within the game language without departing from the spirit and scope of the present invention. In all implementations the coordinates system associated with a virtual space may be utilized to discern geographic position of a player navigating through the game such that each active player may be tracked throughout the game revealing the navigation paths through the space and through features that provide interface to other levels or areas of the virtual space that are linked together. Any given player that is active within space 200 may or may not know or be friends with any one or more of the other players tracked within the space.

In another implementation data may be leveraged relative to the objects in the game, including avatars representing players and objects in the terrain or integrated with the terrain. Display management requires the objects be displayed at specific areas and positions in the display, which qualifies as a coordinate system. Display position data in one embodiment may be accessed in real time to represent the geo-coordinate information need to determine proximity of players in the virtual world.

In general use of the invention, a tracking system may be utilized to determine navigation paths of all of the eight players active within space 200. A proximity/time (P/T) constraint model may be provided that is legible to tracking SW, and that may enable the tracking SW to discern when any two or more active players come within a proximity range relative to one another for a period of time equal to or greater than a preset period of time of the P/T model.

In this view it may be appreciated that tracked players are depicted in close proximity in pairs, for example players 209 and 210 are traveling together in close proximity on lake 202 toward whirlpool 208. Their navigation paths may have begun at the docks of homes 213 or at some other geographic points in space 200 before the paths intersected or converged as they navigated the lake. Hikers 211 and 212 have close proximity to one another on path 214, while players 215 and 216 have close proximity on road 204. Players on road 205 are somewhat further spaced apart in space 200 than are the other tracked players. The tracking system or a component thereof determines by the P/T constraint model if there are any events where two or more of the active players navigating the virtual space have been in close proximity (P value) for a minimum period of time (T).

For players that are deemed in close proximity to one another for the required period of time, the system may recommend one or more friendship actions between the players if they are not already determined to be friends on the particular gaming network they belong to or subscribe to. In one embodiment, there may be a time window within which the system may wait to allow a natural friending action to occur between the tracked players found in close proximity for the minimum amount of time specified. It is also noted herein that players in close proximity may also be interacting with one another in a game such as fighting together or performing some other collaborative action during the time they spend in close proximity to one another.

Figure 3:
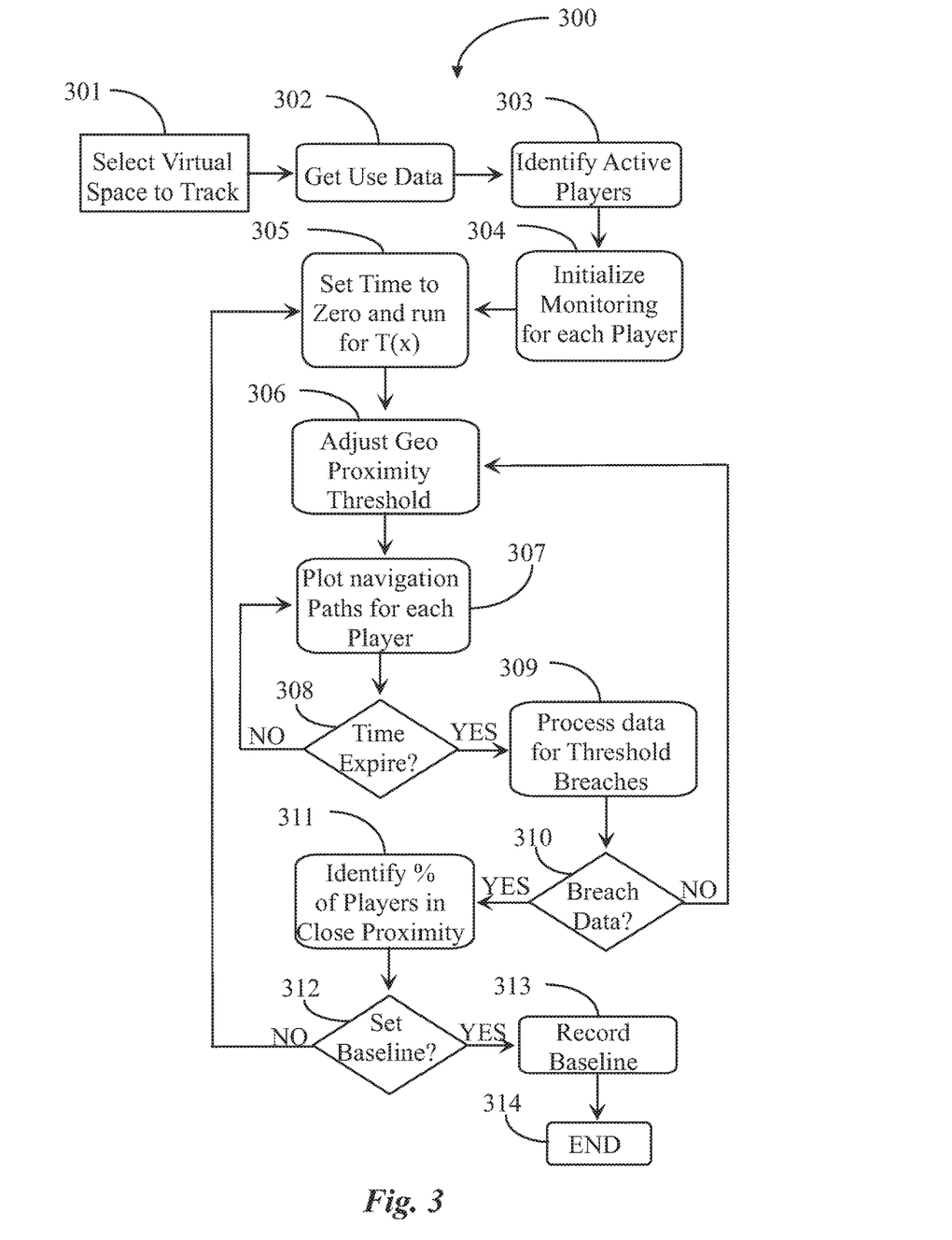
FIG. 3 is a process flow chart depicting steps for creating a proximity/time model for tracking active players in a virtual space according to an embodiment of the present invention.

FIG. 3 is a process flow chart 300 depicting steps for creating a proximity/time model for tracking active players in a virtual space according to an embodiment of the present invention. At step 301, a virtual space such as a virtual world or game is selected for tracking. A virtual space that is tracked may be the entire space available or a portion of the available space of a game or world. It is also noted herein that geographic scaling of the virtual space may be assumed available and discernible to the tracking software for use in plotting player navigation paths.

At step 302, the tracking system may get the use data (game activity feed) from the host server. The game activity data may be specific to actual activity by the players in the game or world such as movement through the game space or terrain. The system may identify all of the active players navigating the virtual space at step 303. At step 304 the tracking software may initialize the monitoring of each active player. In one implementation, the software may ignore an active player such as when it may be known that a player is already friends with the other active players.

At step 305 a timing function or timer may be set to zero and may run for a specified amount of time T (x) denoting an arbitrary period of time that tracking will occur. At step 306, an administrator or knowledge worker may adjust or set an arbitrary proximity threshold for tracking purposes. Therefore, an initial P/T model is established that tells the software what close proximity is between the players and the minimum time the players must be at or within the proximity value for it to be classed as a proximity event by the tracking software.

At step 307, the software plots (tracks) player navigation through the virtual space during T (x) for all of the players or a "targeted" number of the active players. At step 308, it may be determined whether time for tracking T (x) has expired or run out. If the tracking time has not expired at step 308, the process may resolve back to step 307. If time has expired at step 308, the tracked data may be processed for Geo-proximal breaches of the proximity/time threshold. It is important to state here that the initial settings used for defining an effective P/T model (distance value, time value) are the distance value in actual or virtual measurement (MAX distance) over time where time is the "duration" of the occurrence of one or more players remaining within the proximity value of one another and is not related to "the run time" of step 305. The initial run time of step 305 is an arbitrary duration required to discover and to "log" possible proximity events occurring amongst the players.

At step 310, the software looks for Geo-proximal breaches of the proximity threshold that may have occurred during time (x). If it is determined that no breaches have occurred or were detected at step 310, the process may resolve back to step 306 where the proximity threshold may be adjusted (relaxed, or tightened). It is noted herein that time (x) may also be adjusted (extended or shortened). The exact threshold value for proximity might vary from virtual space to virtual space across different worlds or games and may depend in part on total space available (volume). The time variable (duration) of the P/T model is a result of deriving the P/T model as is described further below.

If it is determined that there are breaches of the proximity threshold at step 310, the tracking SW may determine or identify the percentage of the players out of the total number of players tracked that were discovered in "close proximity" at step 311. In setting a baseline for future tracking, the percentage may represent a "mean average" of a total amount of players that may be discovered in close proximity over time. It is noted herein that the average time calculated for the percentage of players having close proximity is a result of discovery and becomes a part of the P/T model.

At step 312, it may be determined whether to set a baseline for future tracking for the targeted virtual space, the baseline being the P/T model, the values of which are dependent upon acceptance of the percentage and time result in the processing of step 311. If it is determined not to set a baseline at step 312, the process may resolve back to step 305 where the run time may be extended or shortened and to step 306 where the proximity value may be increased or decreased. That is to say that the process may be repeated until the administrator or knowledge worker is satisfied with the P/T model for that virtual space. It is noted herein that a P/T model may be specific to a particular virtual space becoming the "baseline" model for that space. A different virtual space may have a P/T model with different values.

If it is determined to accept the results of processing and set the baseline at step 312, the baseline model (P/T) may be recorded for future application at step 313. The process may then end for that virtual space at step 314. In one embodiment, a P/T model derived for one virtual space may be used in tracking active player navigation in another virtual space. Sharing the same P/T model among virtual spaces may depend in part on the total volume and scope of the coordinate system applied to the tracked space, number of active players, and other factors. Once the baseline model is set and recorded, it may be retrieved when the application tracks active players for the purpose of recommending friending actions for that virtual space in the future.

Figure 4:
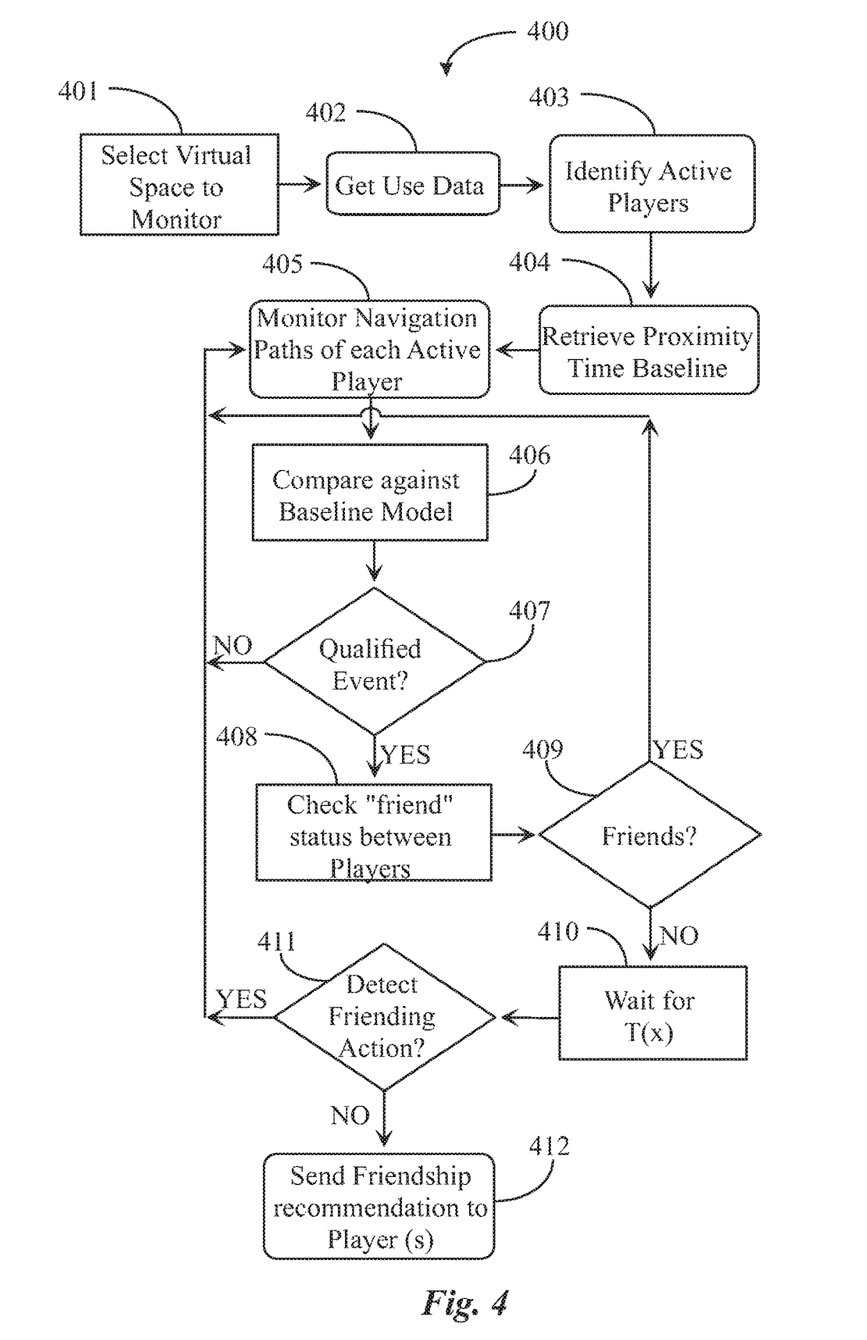
FIG. 4 is a process flow chart depicting steps for tracking active players against the proximity/time model of FIG. 3 and for recommending friending action to players according to an embodiment of the present invention.

FIG. 4 is a process flow chart depicting steps 400 for tracking active players against the proximity/time model of FIG. 3 and for recommending friending actions to players according to an embodiment of the present invention. At step 401, a virtual space is selected to monitor for active players. The virtual space may be a virtual world or virtual game active on the server with active players currently navigating the space. A monitoring application analogous to SW 104 of FIG. 1 may get the use data at step 402. Use data may be the game activity feed for the virtual space pushed from or pulled from a host server.

Active players engaged in the virtual space may be identified for monitoring at step 403. At step 404, the proximity/time (baseline) model 404, associated with the virtual space may be retrieved for use as a constraint during monitoring. The application may monitor the navigation paths of each of the active players traversing the virtual space. It is noted herein that active players may become inactive or drop out of the virtual space and new players may enter the virtual space during the monitoring activity. Steps 403 and 405 may be repeated for newly detected players.

At step 406, the application may compare the activity of the monitored players against the baseline model (recorded earlier) associated with that virtual space. At step 407, it is determined whether or not a qualified proximity event has occurred. If there was no qualified event detected at step 407, the process may resolve back to step 405 (continued monitoring). If one or more qualified events occur at step 407, the application may check current "friend status" between the players identified in the event data. A qualified event is an instance of two or more active players being in proximity to one another (within MAX distance value) for the minimum amount of time.

At step 409, the application determines whether or not the players identified in the qualified event are already friends. If the identified players are friends at step 409, the event may be ignored and the process may resolve back to step 405 for continued monitoring. If at step 409 the active players are not yet friends, the process may in one embodiment, wait at step 410 for a determined amount of time to allow for a possibility that the players will become friends naturally due to the above average time they spent with each other in close proximity. It may be determined at step 411 whether the application has detected a friending action between the players within the time window of step 410.

If the application detects a friending action in step 411, the process may resolve back to step 405 for continued monitoring. If it is determined that the active players are still not friends at step 411, the application may generate and send a friendship recommendation to one or more of the players at step 412. A recommendation may be sent in the form of a notification through a messaging component of a gaming application or through another interface available to the players. It is noted herein that it is possible to detect more than two active players in close proximity wherein individual ones of the players are friends with individual ones of the other players but not all of them. In this case, the application may simply make recommendations where appropriate between individual ones of the players that are not yet friends.

It will be apparent to one with skill in the art that the recommendation system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A method, comprising:
   creating, in a network-connected server, a virtual environment including landscape objects and avatars, the virtual environment comprising a matrix coordinate system enabling quantifying positions of objects and avatars with reference to coordinates in the coordinate system;
   establishing a network connection between the network-connected server and a first network-connected player's platform;
   establishing a network connection between the network-connected server and a second network-connected player's platform;
   initiating a video game involving avatars in the virtual environment;
   admitting the first player's platform as a player in the video game;
   admitting the second player's platform as a player in the video game;
   associating a first avatar in the video game with the first player's platform, enabling the first player to move the associated avatar to different positions in the virtual environment, displaying the first player's avatar in a display screen at the first players' platform and in a display screen at the second player's platform;
   associating a second avatar in the video game with the second player's platform, enabling the second player to move the associated avatar to different positions in the virtual environment, displaying the first player's avatar in a display screen at the first players' platform and in a display screen at the second player's platform;
   establishing a specific distance in terms of the matrix coordinate system as a definition of proximity;
   tracking both the first player's avatar, as it is moved by the first player, relative to position and time in the matrix coordinate space;
   tracking the second player's avatar, as it is moved by the second player, relative to position and time in the matrix coordinate space;
   at specific points in time, over a specific time period, noting position of both the first and second player's avatars;
   at the specific points in time, determining a distance in the matrix coordinate system between the positions of the first and second player's avatars;
   comparing, at the specific points in time, the distance between the first and second player's avatars with the specific distance established as the definition of proximity;
   determining a total period of time that the first player's avatar and the second player's avatar, during the specific time period, are separated by a distance within the specific distance established as a definition of proximity; and
   issuing to one or both players, by the network-connected server, over the network connection between the network-connected server and the player's platforms, a Friend suggestion for the other player, based on proximity events and time in proximity.

2. The method of claim 1 wherein a definition of proximity is based upon a predefined area in the virtual environment.

3. The method of claim 2 wherein one or more predefined areas are determined by specific terrain or building elements by location in the matrix coordinate system.

4. The method of claim 1 wherein events and time in proximity are recorded and associated with each player, and Friend suggestion is initiated based on repetitions of threshold events and total time in proximity.

5. The method of claim 1 wherein, once a Friend suggestion is determined to be warranted, a time delay is imposed before a Friend suggestion is issued.

6. The method of claim 5 further comprising determining at the end of the time delay whether the two players have become friends during the time delay, and cancelling the friend suggestion if true.

7. The method of claim 1 wherein multiple games and a plurality of players are tracked, and records are updated and friend suggestions are issued at specific periods.

8. A video game system, comprising:
   a network-connected server having a processor executing software from a non-transitory medium, execution of the software providing:
   a virtual environment including landscape objects and avatars, the virtual environment comprising a matrix coordinate system enabling quantifying positions of objects and avatars with reference to coordinates in the coordinate system, the virtual environment capable of being streamed as data on the network;
   a video game including landscape elements and avatars implemented in the virtual environment;
   mechanisms by execution of the software for admitting players to select and play the game;
   memory enabled to record data regarding players and games;
   a first network-connected player's platform, connected over the network to the network-connected server;
   a second network-connected player's platform, connected over the network to the network-connected server;
   where execution of the software also provides:
   admitting the first player's platform as a player in the video game;
   admitting the second player's platform as a player in the video game;
   associating a first avatar in the video game with the first player's platform, enabling the first player to move the associated avatar to different positions in the virtual environment, displaying the first player's avatar in a display screen at the first players' platform and in a display screen at the second player's platform;
   associating a second avatar in the video game with the second player's platform, enabling the second player to move the associated avatar to different positions in the virtual environment, displaying the first player's avatar in a display screen at the first players' platform and in a display screen at the second player's platform;

establishing a specific distance in terms of the matrix coordinate system as a definition of proximity;

tracking both the first player's avatar, as it is moved by the first player, relative to position and time in the matrix coordinate space;

tracking the second player's avatar, as it is moved by the second player, relative to position and time in the matrix coordinate space;

at specific points in time, over a specific time period, noting position of both the first and second player's avatars;

at the specific points in time, determining a distance in the matrix coordinate system between the positions of the first and second player's avatars;

comparing, at the specific points in time, the distance between the first and second player's avatars with the specific distance established as the definition of proximity;

determining a total period of time that the first player's avatar and the second player's avatar, during the specific time period, are separated by a distance within the specific distance established as a definition of proximity; and issuing to one or both players, by the network-connected server, over the network connection between the network-connected server and the player's platforms, a Friend suggestion for the other player, based on proximity events and time in proximity.

9. The video game platform of claim 8 wherein a definition of proximity is based upon a predefined area in the virtual environment.

10. The video game platform of claim 9 wherein one or more predefined areas are determined by specific terrain or building elements by location in the matrix coordinate system.

11. The video game platform of claim 8 wherein events and time in proximity are recorded and associated with each player, and Friend suggestion is initiated based on repetitions of threshold events and total time in proximity.

12. The video game platform of claim 8 wherein, once a Friend suggestion is determined to be warranted, a time delay is imposed before a Friend suggestion is issued.

13. The video game platform of claim 12 further comprising determining at the end of the time delay whether the two players have become friends during the time delay, and cancelling the friend suggestion if true.

14. The video game platform of claim 8 wherein multiple games and a plurality of players are tracked, and records are updated and friend suggestions are issued at specific periods.

* * * * *